(12) United States Patent
Yao et al.

(10) Patent No.: US 11,475,695 B2
(45) Date of Patent: Oct. 18, 2022

(54) ULTRASONIC FINGERPRINT RECOGNITION CIRCUIT, DISPLAY PANEL, DISPLAY DEVICE AND DRIVING METHOD

(71) Applicant: Xiamen Tianma Micro-Electronics Co., Ltd., Xiamen (CN)

(72) Inventors: Qijun Yao, Shanghai (CN); Lu Lian, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/330,444

(22) Filed: May 26, 2021

(65) Prior Publication Data

US 2021/0279438 A1 Sep. 9, 2021

(30) Foreign Application Priority Data

Jan. 28, 2021 (CN) .......................... 202110119559.6

(51) Int. Cl.
*G06V 40/12* (2022.01)
*G06V 40/13* (2022.01)
*G09G 3/20* (2006.01)

(52) U.S. Cl.
CPC ........... *G06V 40/1306* (2022.01); *G09G 3/20* (2013.01); *G09G 2310/0278* (2013.01)

(58) Field of Classification Search
CPC ................. G06V 40/1306; G09G 3/20; G09G 2310/0278
See application file for complete search history.

(56) References Cited

U.S. PATENT DOCUMENTS

2021/0406497 A1\* 12/2021 Li ......................... G01S 7/5202

FOREIGN PATENT DOCUMENTS

| CN | 111126352 A | * | 5/2020 | ........... G06K 9/0002 |
| KR | 1376228 B1 | * | 4/2014 | ........... G06K 9/0002 |
| WO | WO-2020232632 A1 | * | 11/2020 | ......... G01S 15/8965 |

OTHER PUBLICATIONS

English machine translation of CN-111126352-A (Year: 2020).*

\* cited by examiner

*Primary Examiner* — Stephen G Sherman
(74) *Attorney, Agent, or Firm* — Kilpatrick Townsend & Stockton, LLP

(57) ABSTRACT

Provided are an ultrasonic fingerprint recognition circuit, a display panel, a display device and a driving method. A first end of the ultrasonic fingerprint recognizer is electrically connected to an ultrasonic signal input end of the ultrasonic fingerprint recognition circuit, and a second end of the ultrasonic fingerprint recognizer is electrically connected to a first end of the acquisition device; a control end of the sampling signal device is electrically connected to a sampling control end of the ultrasonic fingerprint recognition circuit, a first end of the sampling signal device is electrically connected to a first sampling signal end of the ultrasonic fingerprint recognition circuit, a second end of the sampling signal device is electrically connected to a second sampling signal end of the ultrasonic fingerprint recognition circuit, and a third end of the sampling signal device is electrically connected to a control end of the acquisition device.

19 Claims, 12 Drawing Sheets

In an excitation phase, a first sampling control voltage is applied to the sampling control end, a first sampling voltage is applied to the first sampling signal end, a first bias voltage is applied to the bias voltage end, and an oscillation voltage is applied to the first end of the ultrasonic fingerprint recognizer; and the acquisition device transmits the first bias voltage to the second end of the ultrasonic fingerprint recognizer to respond to the first sampling voltage, and the ultrasonic fingerprint recognizer transmit ultrasonic waves based on a voltage of the first end and a voltage of the second end ~S110

In a sampling phase, a second sampling control voltage is applied to the sampling control end, a second sampling voltage is applied to the second sampling signal end, and a second bias voltage is applied to the bias voltage end; and the acquisition device transmits the second bias voltage to the second end of the ultrasonic fingerprint recognizer to respond to the second sampling voltage, and the ultrasonic fingerprint recognizer receives ultrasonic echo reflected by a touched subject, generates an induced voltage, and stores the induced voltage in the storage device ~S120

In a reading phase, a first scan voltage is applied to the scan signal input end, and the reading device reads voltage information of the second end of the ultrasonic fingerprint recognizer to the data signal end to respond to the first scan voltage ~S130

FIG. 11

ULTRASONIC FINGERPRINT RECOGNITION CIRCUIT, DISPLAY PANEL, DISPLAY DEVICE AND DRIVING METHOD

CROSS-REFERENCE TO RELATED APPLICATION

This application claims priority to Chinese Patent Application No. 202110119559.6 filed Jan. 28, 2021, the disclosure of which is incorporated herein by reference in its entirety.

FIELD

The present disclosure relates to the field of displays and, in particular, to an ultrasonic fingerprint recognition circuit, a display panel, a display device and a driving method.

BACKGROUND

Fingerprint recognition technology can authenticate users through fingerprints, to improve security of the display device. The first generation of fingerprint recognition technology uses optical recognition. Since light cannot penetrate the epidermis of the skin and cannot penetrate deep into the dermis. It can only scan the surface of the finger's skin or the dead skin layer. In this case, dirty fingers may greatly weaken recognition effect. The second-generation fingerprint recognition uses capacitive sensor technology, which allows silicon wafers and subcutaneous electrolyte to form an electric field. As fingerprints have ridges and valleys, causing changes in the pressure difference between the silicon wafer and the subcutaneous electrolyte, so that fingerprints can be recognized. However, as the sensor is made of silicon is easy to wear, and the recognition rate will be reduced when the finger is dirty, wet, or peeling.

As an emerging fingerprint recognition technology, ultrasonic fingerprint recognition has been gradually attracting attention of the public. Ultrasonic fingerprint recognition is the third generation of fingerprint recognition technology. Due to strong penetration capability of ultrasonic waves, fingerprints can be recognized even when there is water damage or stain on the surface of the finger. Therefore, ultrasonic fingerprint recognition technology is being widely used.

SUMMARY

The present disclosure provides an ultrasonic fingerprint recognition circuit, a display panel, a display device and a driving method, which improves the accuracy of fingerprint recognition.

In one embodiment of the present disclosure provides an ultrasonic fingerprint recognition circuit, which comprises an ultrasonic fingerprint recognizer, a sampling signal device, an acquisition device, a storage device, and a reading device.

A first end of the ultrasonic fingerprint recognizer is electrically connected to the ultrasonic signal input end of the ultrasonic fingerprint recognition circuit, and a second end of the ultrasonic fingerprint recognizer is electrically connected to a first end of the acquisition device.

A control end of the sampling signal device is electrically connected to the sampling control end of the ultrasonic fingerprint recognition circuit, a first end of the sampling signal device is electrically connected to the first sampling signal end of the ultrasonic fingerprint recognition circuit, and a second end of the sampling signal device is electrically connected to the second sampling signal end of the ultrasonic fingerprint recognition circuit, and a third end of the sampling signal device is electrically connected to the control end of the acquisition device.

A second end of the acquisition device is electrically connected to a bias voltage end of the ultrasonic fingerprint recognition circuit.

A first end of the storage device is electrically connected to the second end of the ultrasonic fingerprint recognizer, and a second end of the storage device is electrically connected to the power signal end of the ultrasonic fingerprint recognition circuit;

A first control end of the reading device is electrically connected to the second end of the ultrasonic fingerprint recognizer, a second control end of the reading device is electrically connected to the scan signal input end of the ultrasonic fingerprint recognition circuit, and a first end of the reading device is electrically connected to the power signal end of the ultrasonic fingerprint recognition circuit, and a second end of the reading device is electrically connected to the data signal end of the ultrasonic fingerprint recognition circuit.

In one embodiment of the present disclosure provides a display panel including the ultrasonic fingerprint recognition circuit described in the other embodiments.

In another embodiment of the present disclosure provides a display device including the display panel described in other embodiments.

In yet another embodiment of the present disclosure provides a driving method for driving the ultrasonic fingerprint recognition circuit described in the other embodiments.

In an excitation phase, a first sampling control voltage is applied to the sampling control end, and a first sampling voltage is applied to the first sampling signal end, a first bias voltage is applied to the bias voltage end, and an oscillation voltage is applied to the first end of the ultrasonic fingerprint recognizer. The acquisition device responds to the first sampling voltage to transmit the first bias voltage to the second end of the ultrasonic fingerprint recognizer, and the ultrasonic fingerprint recognizer transmits ultrasonic waves based on a voltage of the first end and a voltage of the second end.

In a sampling phase, a second sampling control voltage is applied to the sampling control end, a second sampling voltage is applied to the second sampling signal end, and a second bias voltage is applied to the bias voltage end. The acquisition device responds to the second sampling voltage to transmit the second bias voltage to the second end of the ultrasonic fingerprint recognizer, the ultrasonic fingerprint recognizer receives ultrasonic echo reflected by a touched subject, generates an induced voltage, and stores the induced voltage in a storage device.

In a reading phase, a first scanning voltage is applied to the scanning signal input end, and the reading device responds to the first scanning voltage to read voltage information of the second end of the ultrasonic fingerprint recognizer to the data signal end.

The second sampling voltage is less than the first sampling voltage.

In the embodiment of the present disclosure, the second end of the ultrasonic fingerprint recognizer and the first end of the acquisition device each are electrically connected to a node, the first end of the sampling signal device is electrically connected to the first sampling signal end, the second end of the sampling signal device is electrically connected to the second sampling signal end, and the second end of the acquisition device is electrically connected to the bias voltage end of the ultrasonic fingerprint recognition circuit. In the excitation phase, the first sampling voltage of the first sampling signal end is transmitted to the output end of the sampling signal device and is applied to the control end of the acquisition device, and the first bias voltage of the bias voltage end is applied to the node. In the sampling phase, the second sampling voltage of the second sampling signal end is transmitted to the output end of the sampling signal device and is applied to the control end of the acquisition device, and the second bias voltage of the bias voltage end is applied to the node. In the excitation phase and the sampling phase, bias voltage is applied to the node through a same acquisition device.

In the excitation phase, the first sampling voltage of the first sampling signal end is applied to the control end of the acquisition device. In the sampling phase, the second sampling voltage of the second sampling signal end is applied to the control end of the acquisition device. Therefore, different sampling voltage signals (e.g., the second sampling voltage is less than the first sampling voltage) can be applied to the control end of the acquisition device by the first sampling signal end and the second sampling signal end during the excitation phase and the sampling phase, thus improving acquisition accuracy in the sampling phase and fingerprint recognition accuracy compared with applying same sampling voltage signal to the control end of the acquisition device during the excitation phase and the sampling phase.

BRIEF DESCRIPTION OF DRAWINGS

FIG. 11 is a flowchart of a driving method of an ultrasonic fingerprint recognition circuit provided by an embodiment of the present disclosure;

DETAILED DESCRIPTION

Figure 1:
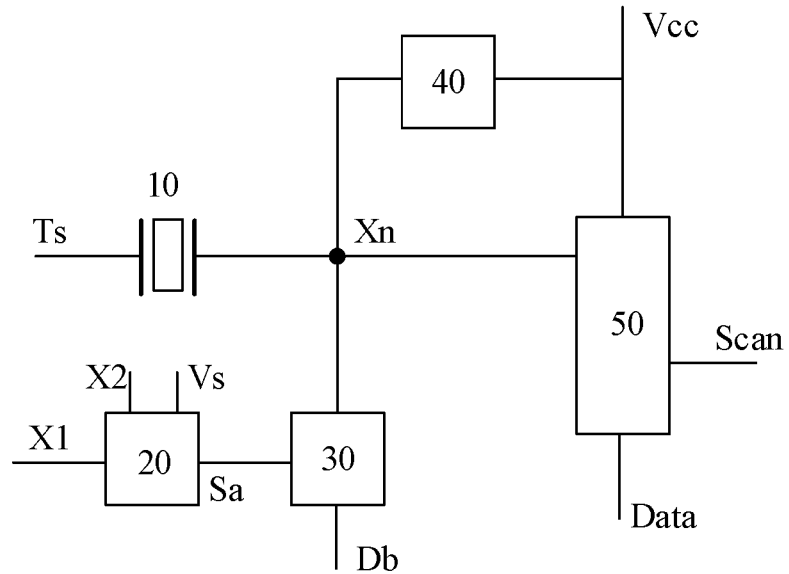
FIG. 1 is a circuit diagram of an ultrasonic fingerprint recognition circuit provided by an embodiment of the present disclosure.

Hereinafter the present disclosure will be further described in detail in conjunction with the drawings and embodiments. It is to be understood that the embodiments set forth herein are merely intended to illustrate and not to limit the present disclosure. Additionally, it is to be noted that for ease of description, merely part, not all, of the structures related to the present disclosure are illustrated in the drawings.

FIG. 1 is a circuit diagram of an ultrasonic fingerprint recognition circuit provided by an embodiment of the present disclosure. With reference to FIG. 1, an ultrasonic fingerprint recognition circuit includes: an ultrasonic fingerprint recognizer 10, a sampling signal device 20, an acquisition device 30, a storage device 40, and a reading device 50. A first end of the ultrasonic fingerprint recognizer 10 is electrically connected to an ultrasonic signal input end Ts of the ultrasonic fingerprint recognition circuit, and a second end of the ultrasonic fingerprint recognizer 10 is electrically connected to a first end of the acquisition device 30. A second end of the ultrasonic fingerprint recognizer 10 and a first end of the acquisition device 30 are electrically connected to form a node Xn. A control end of the sampling signal device 20 is electrically connected to a sampling control end X1 of the ultrasonic fingerprint recognition circuit, a first end of the sampling signal device 20 is electrically connected to a first sampling signal end X2 of the ultrasonic fingerprint recognition circuit, a second end of the sampling signal device 20 is electrically connected to a second sampling signal end Vs of the ultrasonic fingerprint recognition circuit, and a third end of the sampling signal device 20 (that is, an output end Sa of the sampling signal device 20) is electrically connected to a control end of the acquisition device 30. A second end of the acquisition device 30 is electrically connected to a bias voltage end Db of the ultrasonic fingerprint recognition circuit. A first end of the storage device 40 is electrically connected to a second end of the ultrasonic fingerprint recognizer 10, that is, a first end of the storage device 40 is electrically connected to the node Xn, and a second end of the storage device 40 is electrically connected to a power signal end Vcc of the ultrasonic fingerprint recognition circuit. A first control end of the reading device 50 is electrically connected to the second end of the ultrasonic fingerprint recognizer 10, that is, a first control end of the reading device 50 is electrically connected to the node Xn, and a second control end of the reading device 50 is electrically connected to a scan signal input end Scan of the fingerprint recognition circuit, a first end of the reading device 50 is electrically connected to the power signal end Vcc, and a second end of the reading device 50 is electrically connected to a data signal end Data of the ultrasonic fingerprint recognition circuit.

In the embodiment of the present disclosure, the second end of the ultrasonic fingerprint recognizer 10 and the first end of the acquisition device 30 are electrically connected to the node Xn, the first end of the sampling signal device 20 is electrically connected to the first sampling signal end X2, the second end of the sampling signal device 20 is electrically connected to the second sampling signal end Vs, and the second end of the acquisition device 30 is electrically connected to the bias voltage end Db of the ultrasonic fingerprint recognition circuit. In the excitation phase, the first sampling voltage of the first sampling signal end X2 is transmitted to the output end Sa of the sampling signal device 20 and applied to the control end of the acquisition device 30, and the first bias voltage of the bias voltage end Db is applied to the node Xn. In the sampling phase, the second sampling voltage of the second sampling signal end Vs is transmitted to the output end Sa of the sampling signal device 20 and applied to the control end of the acquisition device 30, and the second bias voltage of the bias voltage end Db is applied to node Xn. In the excitation phase and the sampling phase, the bias voltage is applied to the node Xn through the same acquisition device 30. In the excitation phase, the first sampling voltage of the first sampling signal end X2 is applied to the control end of the acquisition device 30. In the sampling phase, the second sampling voltage of the second sampling signal end Vs is applied to the control end of the acquisition device 30. Therefore, different sampling voltage signals (e.g., the second sampling voltage is less than the first sampling voltage) can be applied to the control end of the acquisition device 30 by the first sampling signal end X2 and the second sampling signal end Vs during the excitation phase and the sampling phase, thus improving acquisition accuracy in the sampling phase and fingerprint recognition accuracy compared with applying same sampling voltage signal to the control end of the acquisition device 30 during the excitation phase and the sampling phase.

Figure 2:
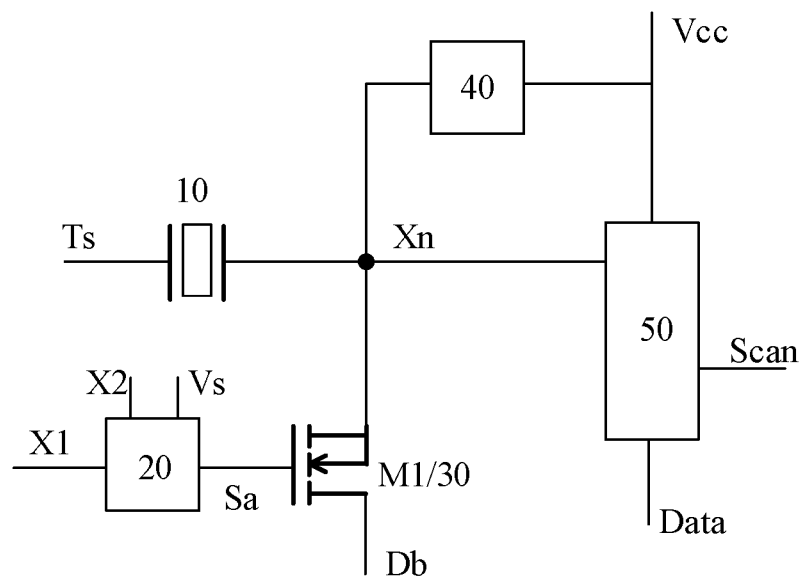
FIG. 2 is a circuit diagram of another ultrasonic fingerprint recognition circuit provided by an embodiment of the present disclosure.

FIG. 2 is a circuit diagram of another ultrasonic fingerprint recognition circuit provided by an embodiment of the present disclosure. With reference to FIG. 2, the acquisition device 30 includes a first transistor M1, and a gate of the first transistor M1 is electrically connected to a third end of the sampling signal device 20, that is, the gate of the first transistor M1 is electrically connected to a output end Sa of the sampling signal device 20. A first electrode of the first transistor M1 is electrically connected to a second end of the ultrasonic fingerprint recognizer 10, that is, a first electrode of the first transistor M1 is electrically connected to the node Xn. A second electrode of the first transistor M1 is electrically connected to a bias voltage end Db. The first electrode of the first transistor M1 may be a source and the second electrode of the first transistor M1 may be a drain, or the first electrode of the first transistor M1 may be a drain and the second electrode of the first transistor M1 may be a source. In the embodiment of the present disclosure, the acquisition device 30 includes a first transistor M1. In the excitation phase, the first sampling voltage of the first sampling signal end X2 is applied to the gate of the first transistor M1 to control the first transistor M1 to be turned on, and the first bias voltage of the bias voltage end Db is applied to the node Xn. In the sampling phase, the second sampling voltage of the second sampling signal end Vs is applied to the control end of the acquisition device 30, and the second bias voltage of the bias voltage end Db is applied to the node Xn. Different sampling voltage signals (e.g., the second sampling voltage is less than the first sampling voltage) can be applied to the control end of the acquisition device 30 by the first sampling signal end X2 and the second sampling signal end Vs during the excitation phase and the sampling phase, thus improving acquisition accuracy in the sampling phase and fingerprint recognition accuracy compared with applying same sampling voltage signal to the control end of the acquisition device 30 during the excitation phase and the sampling phase.

Exemplarily, the difference between the second sampling voltage and the second bias voltage is smaller than the threshold voltage of the first transistor M1, and the voltage difference between the gate and drain of the first transistor M1 and the drain current exhibits a non-linear relationship, the effect is similar to a diode, as it can realize sampling of the induced voltage generated by the ultrasonic fingerprint recognizer 10 for receiving ultrasonic echo. Compared with the diode, the advantage is that, the electrical difference between first transistors M1 due to process variations is smaller, to reduce differences in sampling capabilities of ultrasonic fingerprint recognition circuits and improve signal uniformity of different ultrasonic fingerprint recognition circuits.

Figure 3:
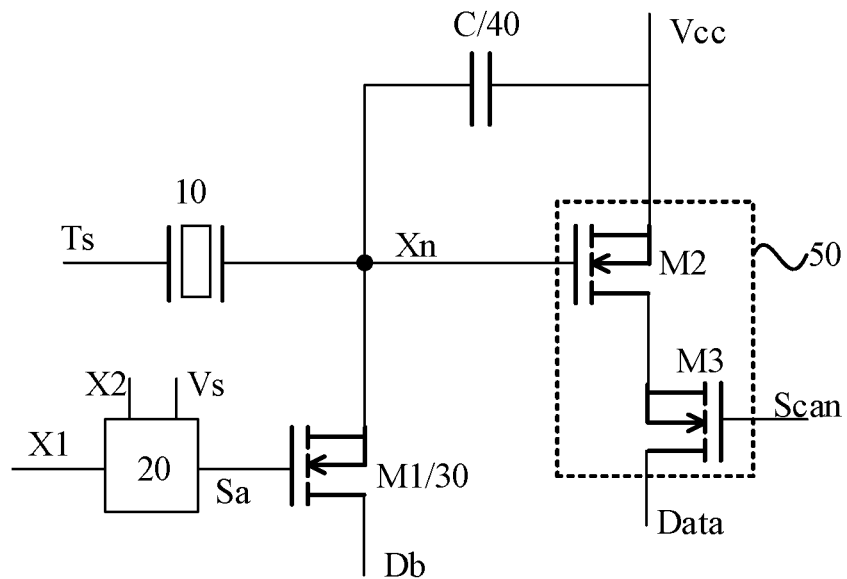
FIG. 3 is a circuit diagram of another ultrasonic fingerprint recognition circuit provided by an embodiment of the present disclosure.

FIG. 3 is a circuit diagram of another ultrasonic fingerprint recognition circuit provided by an embodiment of the present disclosure. With reference to FIG. 3, the storage device 40 includes a capacitor C, and the first electrode of the capacitor C is electrically connected to the second end of the ultrasonic fingerprint recognizer 10, that is, the first electrode of the capacitor C is electrically connected to the node Xn. The second electrode of the capacitor C is electrically connected to the power signal end Vcc of the ultrasonic fingerprint recognition circuit. The reading device 50 includes a second transistor M2 and a third transistor M3. The gate of the second transistor M2 is electrically connected to the second end of the ultrasonic fingerprint recognizer 10, that is, the gate of the second transistor M2 is electrically connected to the node Xn. The first electrode of the second transistor M2 is electrically connected to the power signal end Vcc, the second electrode of the second transistor M2 is electrically connected to the first electrode of the third transistor M3, and the gate of the third transistor M3 is electrically connected to the scan signal input end Scan, and the second electrode of the third transistor M3 is electrically connected to the data signal end Data. The first electrode of the second transistor M2 may be a source and the second electrode of the second transistor M2 may be a drain, or the first electrode of the second transistor M2 may be a drain and the second electrode of the second transistor M2 may be a source. The first electrode of the third transistor M3 may be a source and the second electrode of the third transistor M3 may be a drain, or the first electrode of the third transistor M3 may be a drain and the second electrode of the third transistor M3 may be a source. In the embodiment of the present disclosure, the storage device 40 includes a capacitor C. The ultrasonic fingerprint recognizer 10 receives the ultrasonic echo reflected by the touched subject, generates an induced voltage, and stores the induced voltage in the capacitor C. The reading device 50 includes a second transistor M2 and a third transistor M3. Since the voltage of the node Xn is maintained by the capacitor C, during the reading phase, the gate of the second transistor M2 is turned on under the voltage control of the node Xn, and the first scanning voltage is applied to the scanning signal input end Scan, the gate of the second transistor M2 is turned on under the control of the first scan voltage, and the voltage information of the node Xn is read to the data signal end Data.

Figure 4:
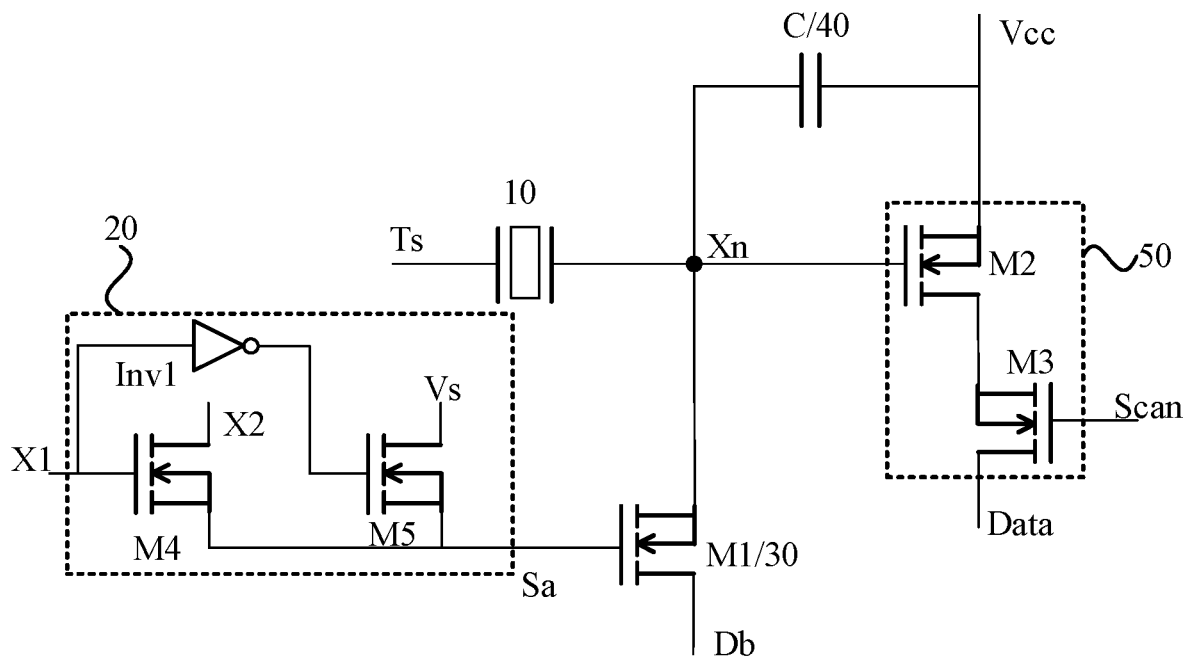
FIG. 4 is a circuit diagram of another ultrasonic fingerprint recognition circuit provided by an embodiment of the present disclosure.

FIG. 4 is a circuit diagram of another ultrasonic fingerprint recognition circuit provided by an embodiment of the present disclosure. With reference to FIG. 4, the sampling signal device 20 includes a fourth transistor M4, a fifth transistor M5, and a first inverter Inv1. The gate of the fourth transistor M4 is electrically connected to the sampling control end X1, the first electrode of the fourth transistor M4 is electrically connected to the first sampling signal end X2 of the ultrasonic fingerprint recognition circuit, and the second electrode of the fourth transistor M4 is electrically connected to the control end of the acquisition device 30. The input end of the first inverter Inv1 is electrically connected to the sampling control end X1, and the output end of the first inverter Inv1 is electrically connected to the gate of the fifth transistor M5. The first electrode of the fifth transistor M5 is electrically connected to the second sampling signal end Vs, and the second electrode of the fifth transistor M5 is electrically connected to the control end of the acquisition device 30. The second electrode of the fourth transistor M4 and the second electrode of the fifth transistor M5 are electrically connected to serve as the output end Sa of the sampling signal device 20, and the output end Sa of the sampling signal device 20 is electrically connected to the control end of the acquisition device 30. The first electrode of the fourth transistor M4 may be a source and the second electrode of the fourth transistor M4 may be a drain, or the first electrode of the fourth transistor M4 may be a drain and the second electrode of the fourth transistor M4 may be a source. The first electrode of the fifth transistor M5 may be a source and the second electrode of the fifth transistor M5 may be a drain, or the first electrode of the fifth transistor M5 may be a drain and the second electrode of the fifth transistor M5 may be a source. In the embodiment of the present disclosure, the sampling signal device 20 includes a fourth transistor M4, a fifth transistor M5, and a first inverter Inv1. The gate of the fourth transistor M4 and the gate of the fifth transistor M5 are connected in series with the first inverter, so that when the fourth transistor M4 is turned on, the fifth transistor M5 is turned off and the first sampling signal output by the first sampling signal end X2 of the ultrasonic fingerprint recognition circuit is transmitted to the output end Sa of the sampling signal device 20. When the fifth transistor M5 is turned on, the fourth transistor M4 is turned off, and the second sampling signal output by the second sampling signal end Vs of the ultrasonic fingerprint recognition circuit is transmitted to the output end Sa of the sampling signal device 20.

Figure 5:
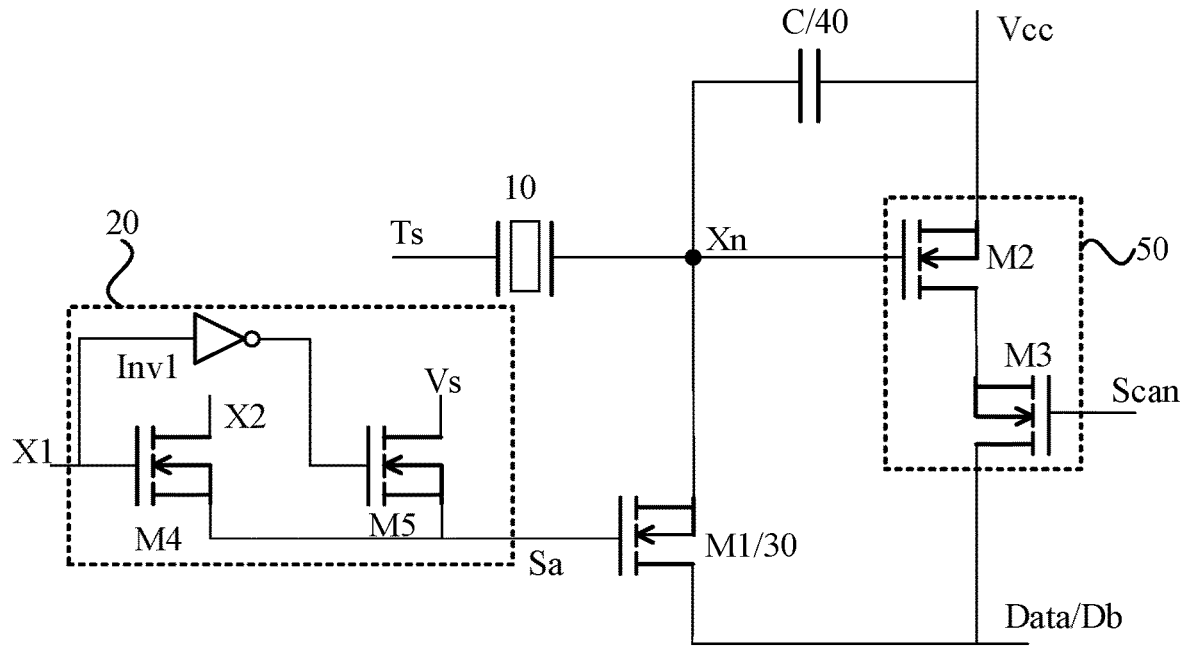
FIG. 5 is a circuit diagram of another ultrasonic fingerprint recognition circuit provided by an embodiment of the present disclosure.

FIG. 5 is a circuit diagram of another ultrasonic fingerprint recognition circuit provided by an embodiment of the present disclosure. With reference to FIG. 5, the second end of the acquisition device 30 is electrically connected to the second end of the reading device 50. In the embodiment of the present disclosure, the second end of the acquisition device 30 is electrically connected to the second end of the reading device 50, so that the wire connecting the second end of the acquisition device 30 and the wire connecting the second end of the reading device 50 can be multiplexed, to reduce a number of wires.

Exemplarily, with reference to FIG. 5, the second electrode of the first transistor M1 is electrically connected to the second electrode of the third transistor M3.

Figure 6:
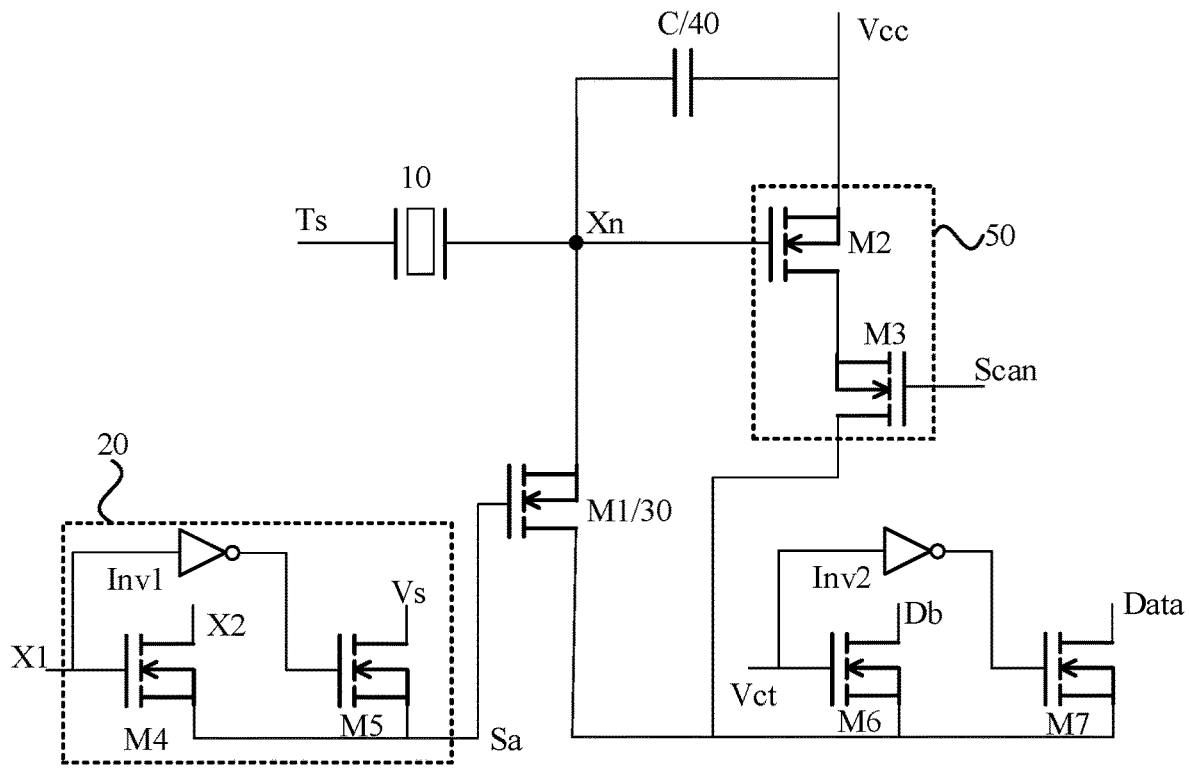
FIG. 6 is a circuit diagram of another ultrasonic fingerprint recognition circuit provided by an embodiment of the present disclosure.

FIG. 6 is a circuit diagram of another ultrasonic fingerprint recognition circuit provided by an embodiment of the present disclosure. With reference to FIG. 6, the ultrasonic fingerprint recognition circuit further includes a sixth transistor M6, a seventh transistor M7, and a second inverter Inv2. The gate of the sixth transistor M6 is electrically connected to the multiplexing control end Vct of the ultrasonic fingerprint recognition circuit, the first electrode of the sixth transistor M6 is electrically connected to the bias voltage end Db, the second electrode of the sixth transistor M6 is electrically connected to the second end of the reading device 50, and the second end of the sixth transistor M6 is also electrically connected to the second end of the acquisition device 30. The input end of the second inverter Inv2 is electrically connected to the multiplexing control end Vct, and the output end of the second inverter Inv2 is electrically connected to the gate of the seventh transistor M7. The first electrode of the seventh transistor M7 is electrically connected to the data signal end Data, the second electrode of the seventh transistor M7 is electrically connected to the second end of the reading device 50, and the second electrode of the seventh transistor M7 is also electrically connected to the second end of the acquisition device 30. The first electrode of the sixth transistor M6 may be a source and the second electrode of the sixth transistor M6 may be a drain, or the first electrode of the sixth transistor M6 may be a drain and the second electrode of the sixth transistor M6 may be a source. The first electrode of the seventh transistor M7 may be a source and the second electrode of the seventh transistor M7 may be a drain, or the first electrode of the seventh transistor M7 may be a drain and the second electrode of the seventh transistor M7 may be a source. In the embodiment of the present disclosure, the ultrasonic fingerprint recognition circuit further includes a sixth transistor M6, a seventh transistor M7, and a second inverter Inv2. The gate of the sixth transistor M6 and the gate of the seventh transistor M7 are connected in series with the second inverter Inv2, so that when the sixth transistor M6 is turned on, the seventh transistor M7 is turned off, and the first bias voltage or the second bias voltage of the bias voltage end Db is applied to the node Xn. When the seventh transistor M7 is turned on, the sixth transistor M6 is turned off, and the voltage information of the node Xn is read to the data signal end Data.

Figure 7:
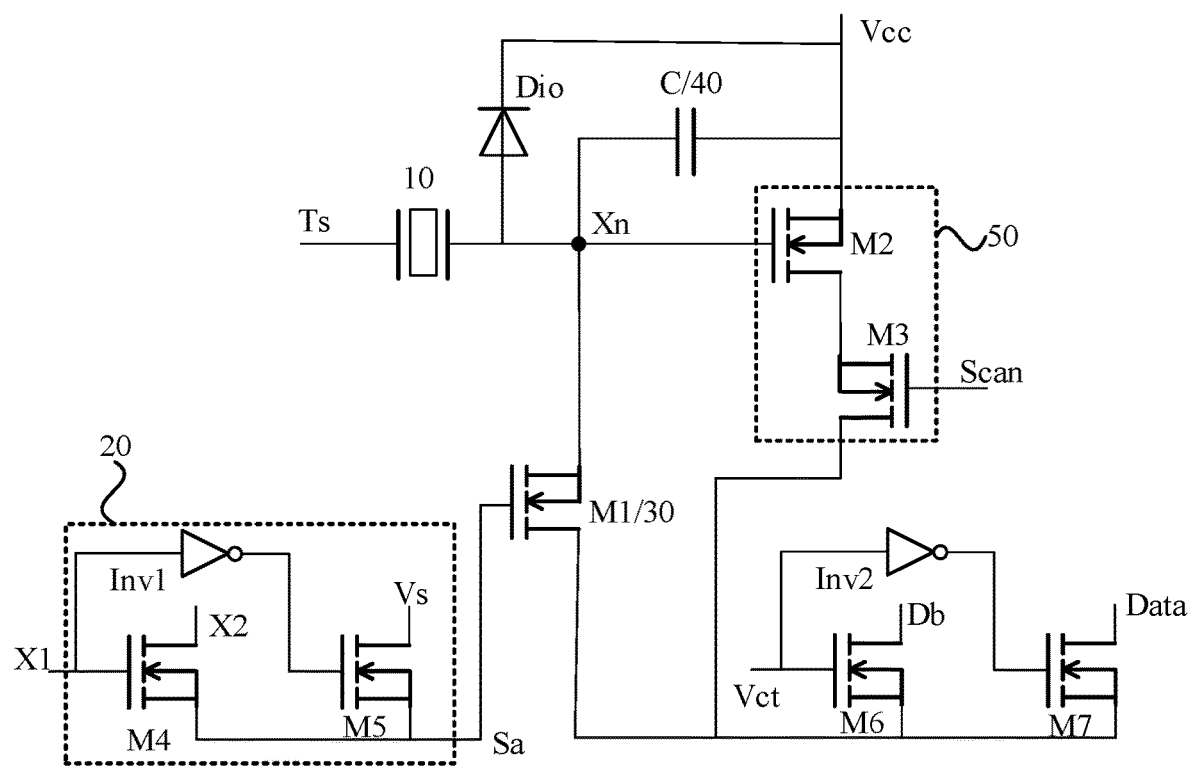
FIG. 7 is a circuit diagram of another ultrasonic fingerprint recognition circuit provided by an embodiment of the present disclosure.

FIG. 7 is a circuit diagram of another ultrasonic fingerprint recognition circuit provided by an embodiment of the present disclosure. With reference to FIG. 7, the ultrasonic fingerprint recognition circuit further includes a diode Dio. The anode of the diode Dio is electrically connected to the second end of the ultrasonic fingerprint recognizer 10, that is, the anode of the diode Dio is electrically connected to the node Xn. The cathode of the diode Dio is electrically connected to the power signal end Vcc. In the embodiment of the present disclosure, a diode Dio is disposed between the node Xn and the power signal end Vcc, so that in the process of high-voltage polarization of the ultrasonic fingerprint recognizer 10, the power signal end Vcc can be grounded, and the large current generated in this process is led to the ground through the diode Dio to avoid damage to the transistors (which include the first transistor M1, the second transistor M2, the third transistor M3, etc.) during the process of high-voltage polarization. After the ultrasonic fingerprint recognition circuit forms, since the cathode of the diode Dio is electrically connected to the power signal end Vcc, the diode Dio is reversely biased and turned off, which does not affect the fingerprint recognition of the ultrasonic fingerprint recognition circuit.

An embodiment of the present disclosure also provides a display panel, which includes the ultrasonic fingerprint recognition circuit in any of the above embodiments. The display panel includes a plurality of display pixels and other well-known structures in the art, which will not be explained in great detail. The display panel in the embodiment of the present disclosure includes the ultrasonic fingerprint recognition circuit in the above-mentioned embodiment, having the beneficial effect of the above-mentioned ultrasonic fingerprint recognition circuit, that is, improving the accuracy of fingerprint recognition.

Figure 8:
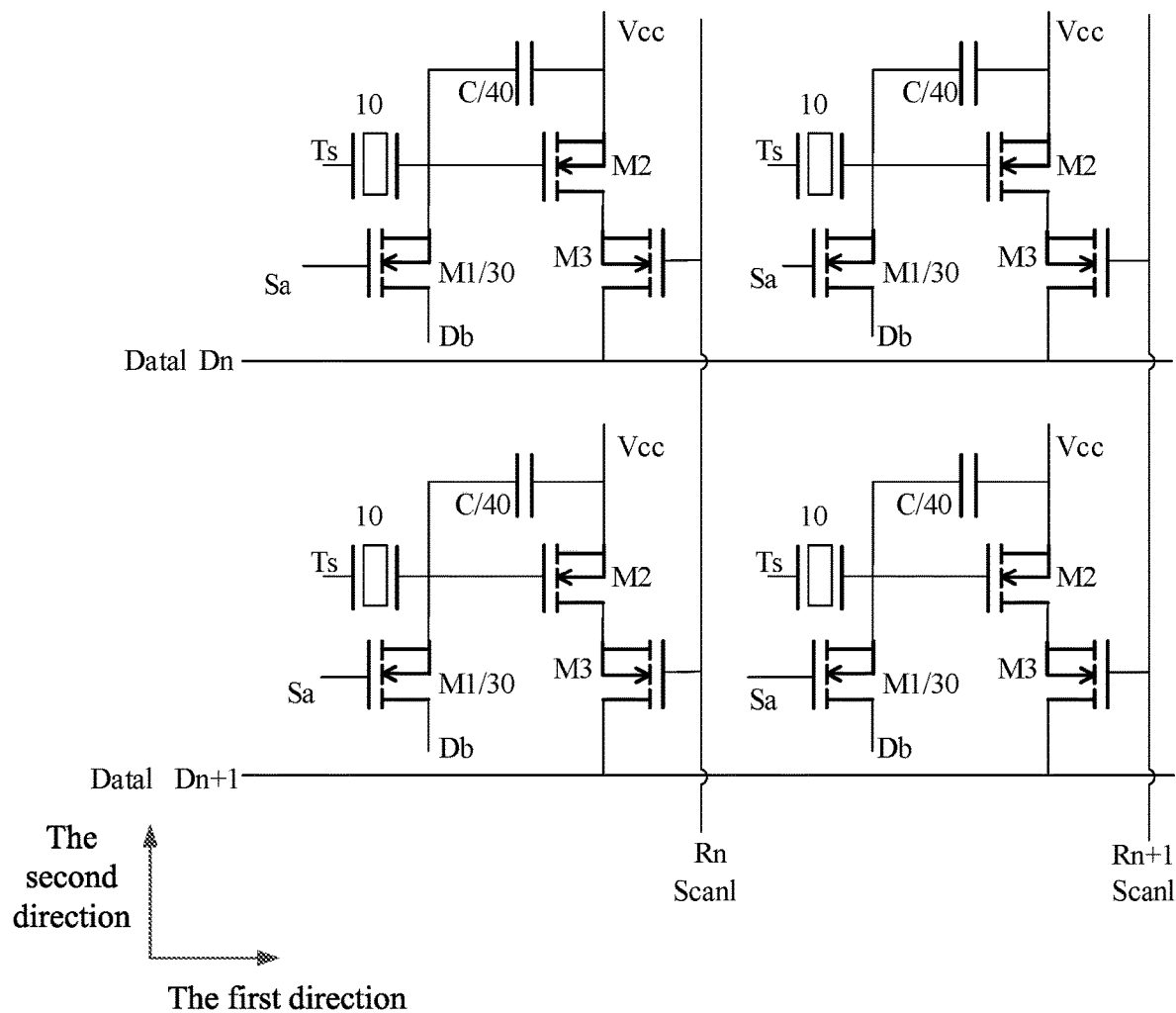
FIG. 8 is a circuit diagram of a display panel provided by an embodiment of the present disclosure.

FIG. 8 is a circuit diagram of a display panel provided by an embodiment of the present disclosure. With reference to FIG. 1 to FIG. 8, the display panel further includes a plurality of scan lines Scan1 and a plurality of data readout lines Data1, and scan lines Scan1 extend along the second direction and are arranged along the first direction, and data readout lines Data1 extend along the first direction and are arranged along the second direction, the first direction intersects the second direction. In an embodiment, the first direction and the second direction may be perpendicular. In another embodiment, the first direction may not be perpendicular to the second direction, with an included angle greater than 0° and less than 90°. The ultrasonic fingerprint recognizer 10 may be located in an area defined by the intersection of a plurality of scan lines Scan1 and data readout lines Data1. Along the first direction, second ends of reading devices 50 in ultrasonic fingerprint recognition circuits are electrically connected to data signal ends Data through a same data reading line Data1. Along the second direction, second control ends of reading devices 50 in ultrasonic fingerprint recognition circuits are electrically connected to the scan signal input ends Scan through a same scan line Scan1.

Exemplarily, with reference to FIG. 8, along the first direction, second electrodes of third transistor M3 in ultrasonic fingerprint recognition circuits are electrically connected to a same data readout line Data1. Along the second direction, gates of third transistors M3 in ultrasonic fingerprint recognition circuits are electrically connected to a same scan line Scan1.

Exemplarily, as shown in FIG. 8, the n-th data readout line Data1 is denoted as Dn, the (n+1)-th data readout line Data1 is denoted as Dn+1, the n-th scan line Scan1 is denoted as Rn, and the (n+1)-th scan line Scan1 is denoted as Rn+1, where n is a positive integer greater than or equal to 1. Along the first direction, second electrodes of third transistor M3 in ultrasonic fingerprint recognition circuits in a row are electrically connected to a data signal end Data through the data readout line Dn, and second electrodes of third transistor M3 in ultrasonic fingerprint recognition circuits in another row are electrically connected to another data signal end Data through the data readout line Dn+1. Similarly, along the second direction, gates of third transistor M3 in ultrasonic fingerprint recognition circuits in a column are electrically connected to a scan signal input end Scan through the scan line Rn, and gates of third transistor M3 in ultrasonic fingerprint recognition circuits in another column are electrically connected to another scan signal input end Scan through the data readout line Rn+1.

Figure 9:
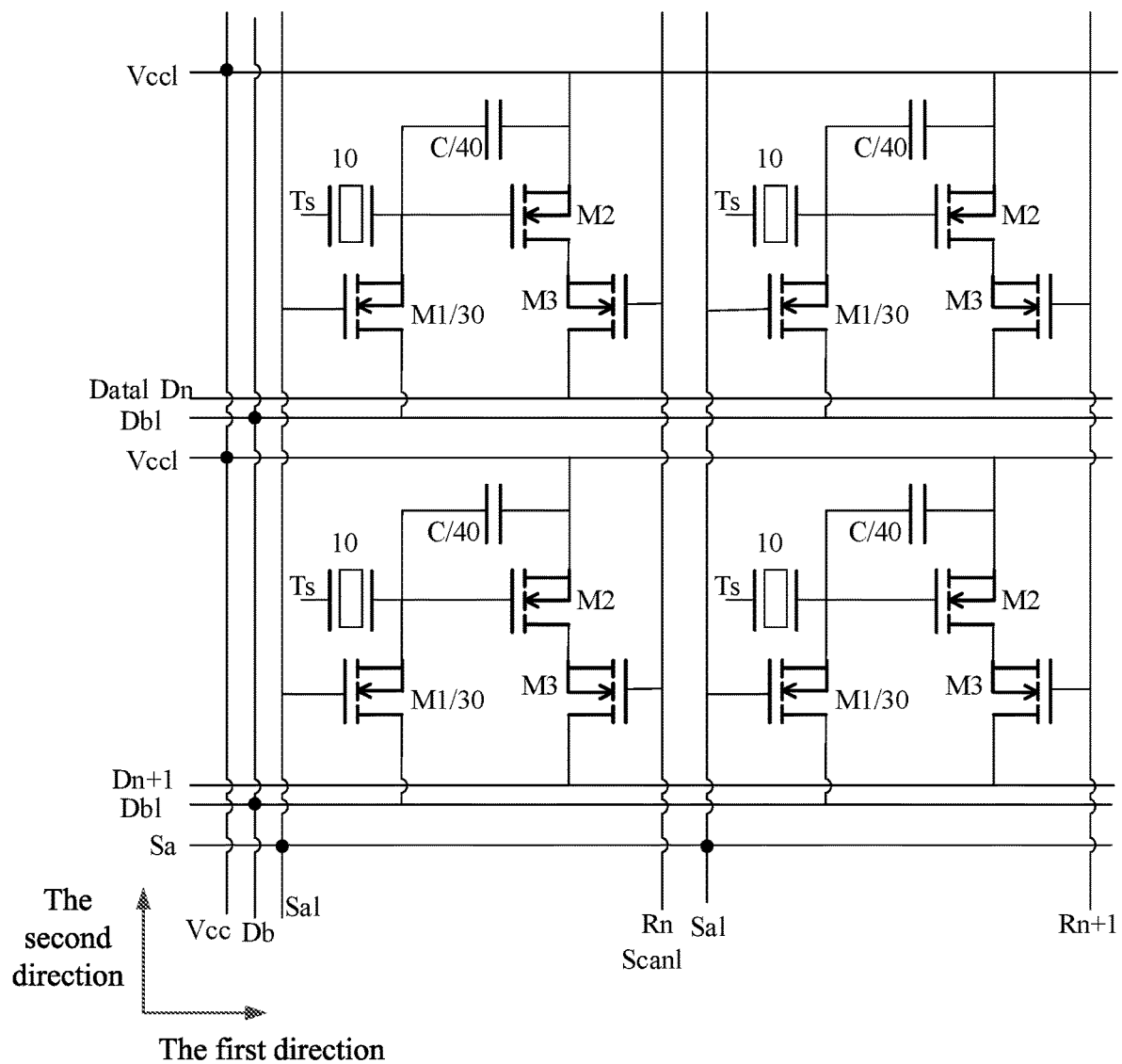
FIG. 9 is a circuit diagram of another display panel provided by an embodiment of the present disclosure.

FIG. 9 is a circuit diagram of another display panel provided by an embodiment of the present disclosure. With reference to FIG. 1 to FIG. 9, the display panel further includes a plurality of power connection lines Vcc1, a plurality of bias voltage connection lines Db1, and a plurality of sampling connection lines Sa1. Along the first direction, first ends of the reading devices 50 in ultrasonic fingerprint recognition circuits are electrically connected to the power signal end Vcc through a same power connection line Vcc1. Along the first direction, second ends of the acquisition device 30 in ultrasonic fingerprint recognition circuits are electrically connected to the bias voltage end Db through a same bias voltage connection line Db1. Along the second direction, control ends of the acquisition device 30 in ultrasonic fingerprint recognition circuits are electrically connected to third end of the sampling signal device 20 through the same sampling connection line Sa1.

Exemplarily, with reference to FIG. 9, a plurality of power connection lines Vcc1 extend in a first direction and are arranged in a second direction, and power connection lines Vcc1 are electrically connected to the same power signal end Vcc. bias voltage connection lines Db1 extend along the first direction and are arranged along the second direction, and bias voltage connection lines Db1 are electrically connected to the same bias voltage end Db. sampling connection lines Sa1 extend along the second direction and are arranged along the first direction, and sampling connection lines Sa1 are electrically connected to the third end of the same sampling signal device 20 (i.e., the output end Sa of the sampling signal device 20).

Figure 10:
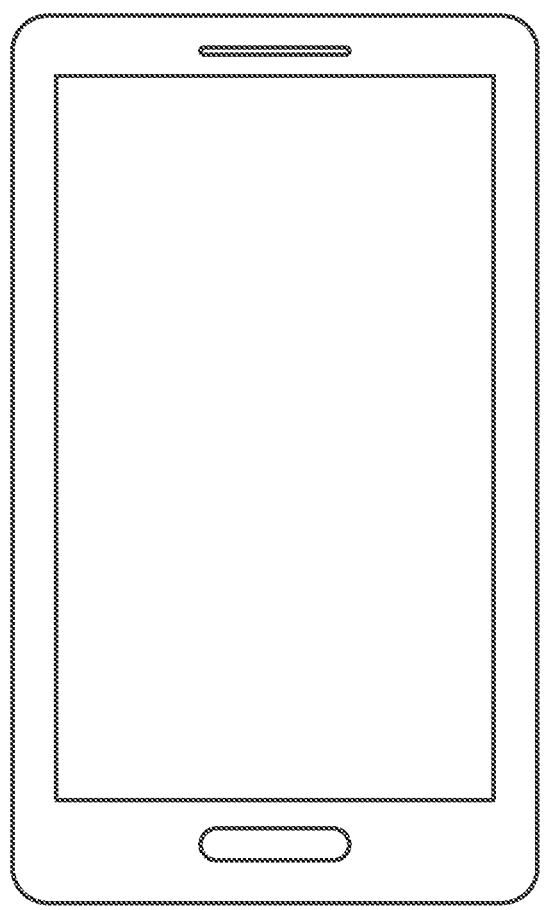
FIG. 10 is a schematic structure view of a display device provided by an embodiment of the present disclosure.

The embodiment of the present disclosure also provides a display device. FIG. 10 is a schematic structure view of a display device provided by an embodiment of the present disclosure. With reference to FIG. 10, the display device includes any display panel provided by an embodiment of the present disclosure. The display device may be a mobile phone, a tablet computer, a smart wearable device, etc.

Figure 12:
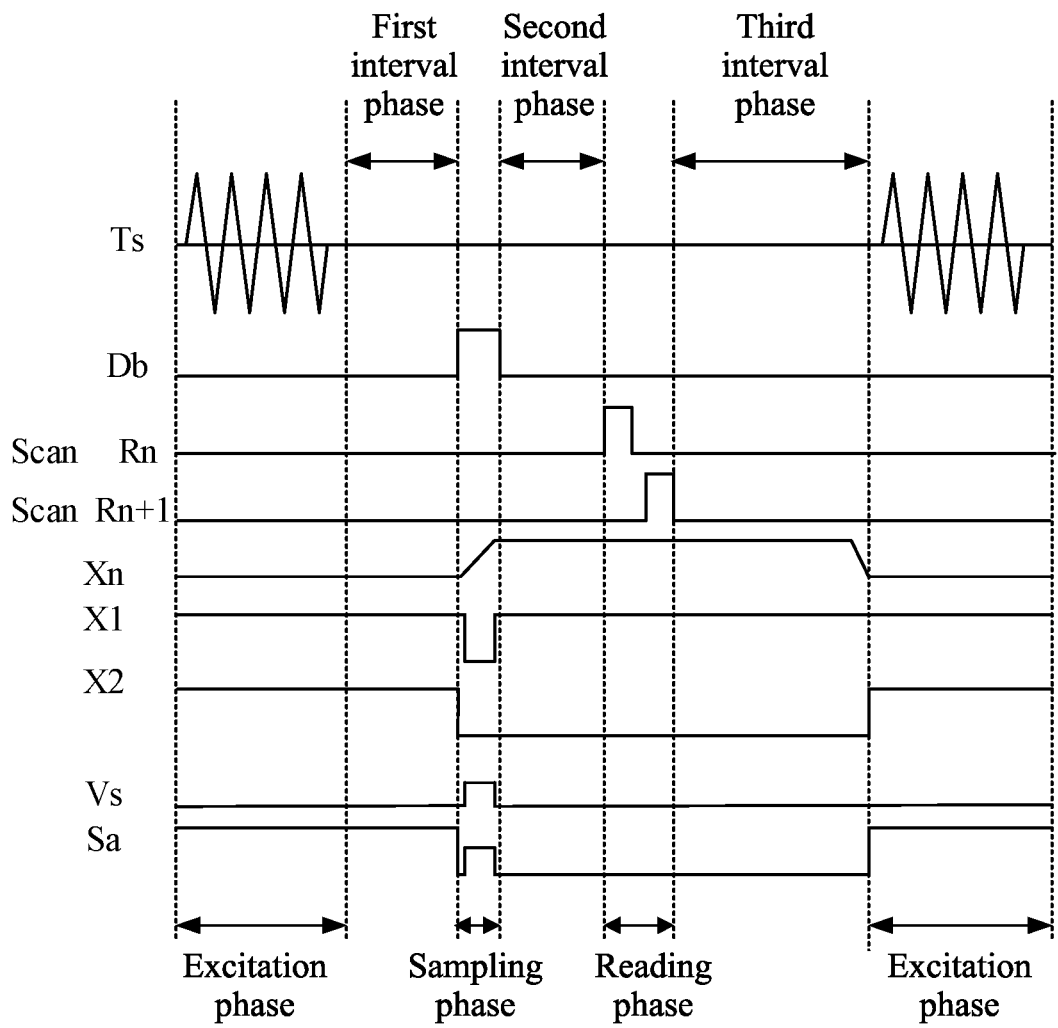
FIG. 12 is a driving timing diagram of an ultrasonic fingerprint recognition circuit provided by an embodiment of the present disclosure.

FIG. 11 is a flowchart of a driving method of an ultrasonic fingerprint recognition circuit provided by an embodiment of the present disclosure, FIG. 12 is a driving timing diagram of an ultrasonic fingerprint recognition circuit provided by an embodiment of the present disclosure, with reference to FIG. 1-12, the driving method of the ultrasonic fingerprint recognition circuit includes step described below.

In S110, In an excitation phase, a first sampling control voltage is applied to the sampling control end X1, a first sampling voltage is applied to the first sampling signal end X2, a first bias voltage is applied to the bias voltage end Db, and an oscillating voltage is applied to the first end of the ultrasonic fingerprint recognizer 10. The acquisition device 30 responds to the first sampling voltage to transmit the first bias voltage to the second end of the ultrasonic fingerprint recognizer 10, and the ultrasonic fingerprint recognizer 10 transmits ultrasonic waves based on a voltage of the first end and a voltage of the second end.

In this step, in the excitation phase, an oscillating voltage is applied to the first end of the ultrasonic fingerprint recognizer 10, that is, an oscillating voltage is applied to the ultrasonic signal input end Ts, thus an oscillating voltage is applied to the first end of ultrasonic fingerprint recognizer 10 through the ultrasonic signal input end Ts. The acquisition device 30 responds to the first sampling voltage to transmit the first bias voltage to the node Xn.

In S120, in a sampling phase, a second sampling control voltage is applied to the sampling control end X1, a second sampling voltage is applied to the second sampling signal end Vs, a second bias voltage is applied to the bias voltage end Db, and the acquisition device 30 responds to the first two sampling voltages to transmit the second bias voltage to the second end of the ultrasonic fingerprint recognizer 10. The ultrasonic fingerprint recognizer 10 receives ultrasonic echo reflected by a touched subject, generates an induced voltage, and stores the induced voltage in the storage device 40.

In this step, in the sampling phase, the acquisition device 30 responds to the second sampling voltage to transmit the second bias voltage to the node Xn. The second sampling voltage is less than the first sampling voltage, therefore, the acquisition device 30 works in a condition different from the excitation phase, to improve acquisition accuracy in the sampling phase. In the sampling phase, the ultrasonic fingerprint recognizer 10 receives the ultrasonic echo and generates an induced voltage, and the induced voltage is superimposed on the second bias voltage of the node Xn and stored in the storage device 40.

In S130, in the reading phase, a first scan voltage is applied to the scan signal input end Scan, and the reading device 50 responds to the first scan voltage to read the voltage information of the second end of the ultrasonic fingerprint recognizer 10 to the data signal end Data.

In this step, since the voltage of the node Xn is maintained by the storage device 40, in the reading phase, the first control end of the reading device 50 responds to the voltage of the node Xn, the second control end of the reading device 50 responds to the first scan voltage to read the voltage information of the node Xn to the data signal end Data.

The embodiment of the present disclosure provides a driving method for driving the above-mentioned ultrasonic fingerprint recognition circuit. In the excitation phase, the first sampling voltage of the first sampling signal end X2 is transmitted to the output end Sa of the sampling signal device 20 and is applied to the output end Sa of the sampling signal device 20. The control end of the acquisition device 30, the first bias voltage of the bias voltage end Db is applied to the node Xn. In the sampling phase, the second sampling voltage of the second sampling signal end Vs is transmitted to the output end Sa of the sampling signal device 20 and is applied to the control end of the acquisition device 30, and the second bias voltage of the bias voltage end Db is applied to node Xn. In the excitation phase and the sampling phase, the bias voltage is applied to the node Xn through the same acquisition device 30. In the excitation phase, the first sampling voltage of the first sampling signal end X2 is applied to the control end of the acquisition device 30; and in the sampling phase, the second sampling voltage of the second sampling signal end Vs is applied to the control end of the acquisition device 30. Therefore, different sampling voltage signals (e.g., the second sampling voltage is less than the first sampling voltage) can be applied to the control end of the acquisition device 30 by the first sampling signal end X2 and the second sampling signal end Vs during the excitation phase and the sampling phase, thus improving acquisition accuracy in the sampling phase and fingerprint recognition accuracy compared with applying same sampling voltage signal to the control end of the acquisition device 30 during the excitation phase and the sampling phase.

In an embodiment, with reference to FIG. 12, in the driving method of the ultrasonic fingerprint recognition circuit, the driving timing further includes a first interval phase, and the first interval phase is between the excitation phase and the sampling phase. In the embodiment of the present disclosure, there is a first interval phase between the excitation phase and the sampling phase, so that the ultrasonic fingerprint recognition circuit can avoid the unstable state at the end of the excitation phase to improve working stability of the ultrasonic fingerprint recognition circuit.

Figure 13:
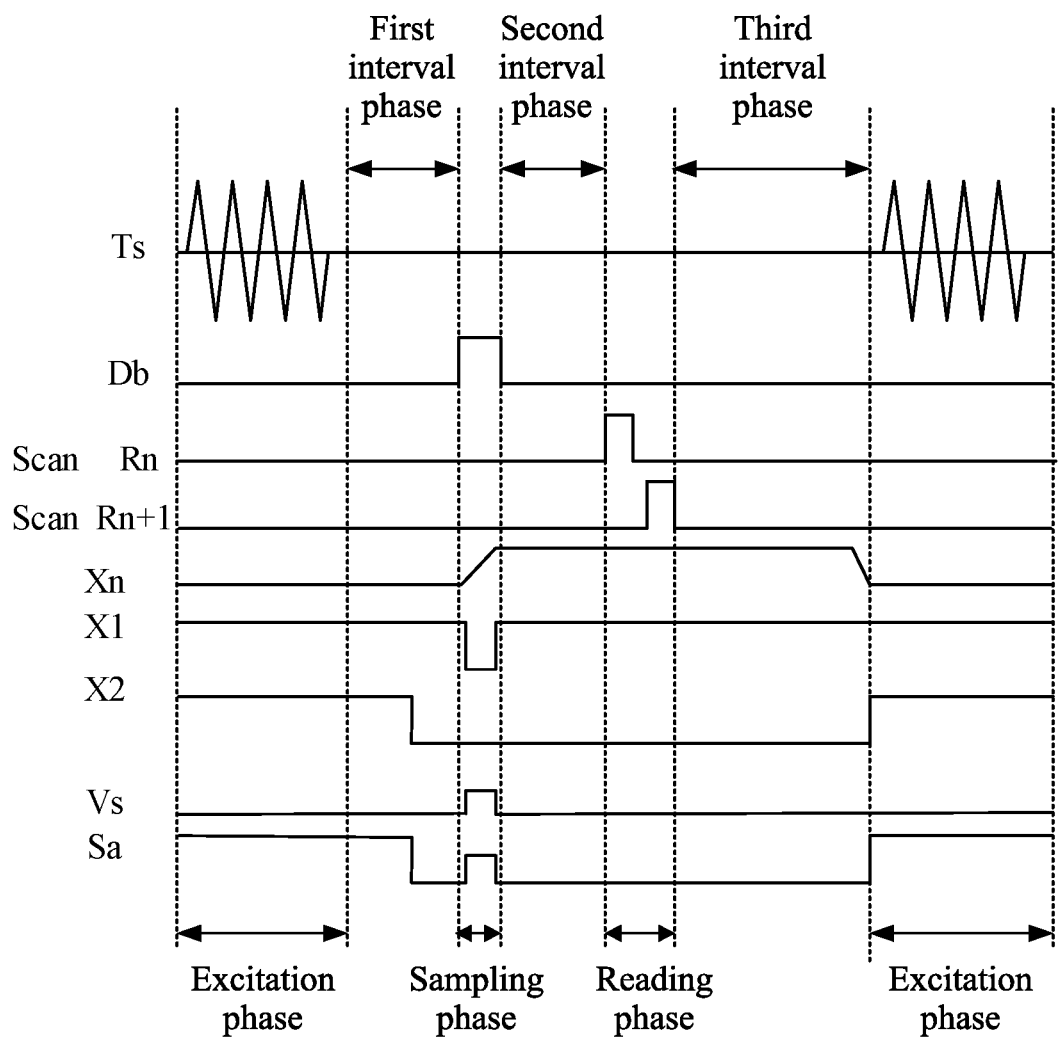
FIG. 13 is a driving timing diagram of another ultrasonic fingerprint recognition circuit provided by an embodiment of the present disclosure.

FIG. 13 is a driving timing diagram of another ultrasonic fingerprint recognition circuit provided by an embodiment of the present disclosure. With reference to FIG. 13, in the first interval phase, a first sampling control voltage is applied to the sampling control end X1, a third sampling voltage is applied to the first sampling signal end X2, the third sampling voltage is less than the first sampling voltage, and the third sampling voltage is less than the second sampling voltage. In the embodiment of the present disclosure, in the excitation phase, the first sampling control voltage is applied to the sampling control end X1, and the first sampling voltage applied to the first sampling signal end X2 is applied to the control end of the acquisition device 30; in the first interval phase, The first sampling control voltage is applied to the sampling control end X1, and the third sampling voltage applied to the first sampling signal end X2 is applied to the control end of the acquisition device 30; in the sampling phase, the second sampling control voltage is applied to the sampling control end X1, the second sampling voltage applied to the second sampling signal end Vs is applied to the control end of the acquisition device 30. Since the third sampling voltage is less than the first sampling voltage and the second sampling voltage, in the embodiments of the present disclosure, different voltage signals are applied to the control end of the acquisition device 30 during the excitation phase and the sampling phase, also a third sampling voltage with a lower voltage is set in the first interval phase of the excitation phase and the sampling phase, that is, in the first interval phase between the excitation phase and the sampling phase, the voltage applied to the control end of the acquisition device 30 is pulled down to improve the accuracy of fingerprint recognition.

In an embodiment, with reference to FIG. 13, the falling edge of the first sampling voltage is generated in the first interval phase, that is, the first sampling voltage applied to the first sampling signal end X2 that transfers from a high level to a low level during the first interval.

In another embodiment, as shown in FIG. 12, the falling edge of the first sampling voltage may also be generated during the sampling phase.

In another embodiment, the falling edge of the first sampling voltage can also be generated in the excitation phase, and the falling edge of the first sampling voltage lies after the oscillating voltage is applied to the ultrasonic signal input end Ts, to ensure that during the oscillating voltage is applied to the ultrasonic signal input end Ts, the first sampling voltage is applied to the control end of the acquisition device 30, the acquisition device 30 transmits the first bias voltage to the node Xn, and the ultrasonic fingerprint recognizer 10 can transmit ultrasonic waves.

In an embodiment, with reference to FIG. 12 and FIG. 13, in the driving method of the ultrasonic fingerprint recognition circuit, the driving timing further includes a second interval phase and a third interval phase. The second interval phase is between the sampling phase and the reading phase, and the third interval phase is between the reading phase of the current frame and the excitation phase of the next frame. In the embodiment of the present disclosure, there is a second interval phase between the sampling phase and the reading phase, so that the ultrasonic fingerprint recognition circuit can avoid the unstable state at the end of the sampling phase; besides, before the reading phase, the acquisition device 30, which is turned on in the sampling phase, is turned off to prevent the leakage of the acquisition device 30 having adverse impact in the reading phase. There is a third interval phase after the reading phase, so that the ultrasonic fingerprint recognition circuit can avoid the unstable state at the end of the reading phase, to improve working stability of the ultrasonic fingerprint recognition circuit.

Figure 14:
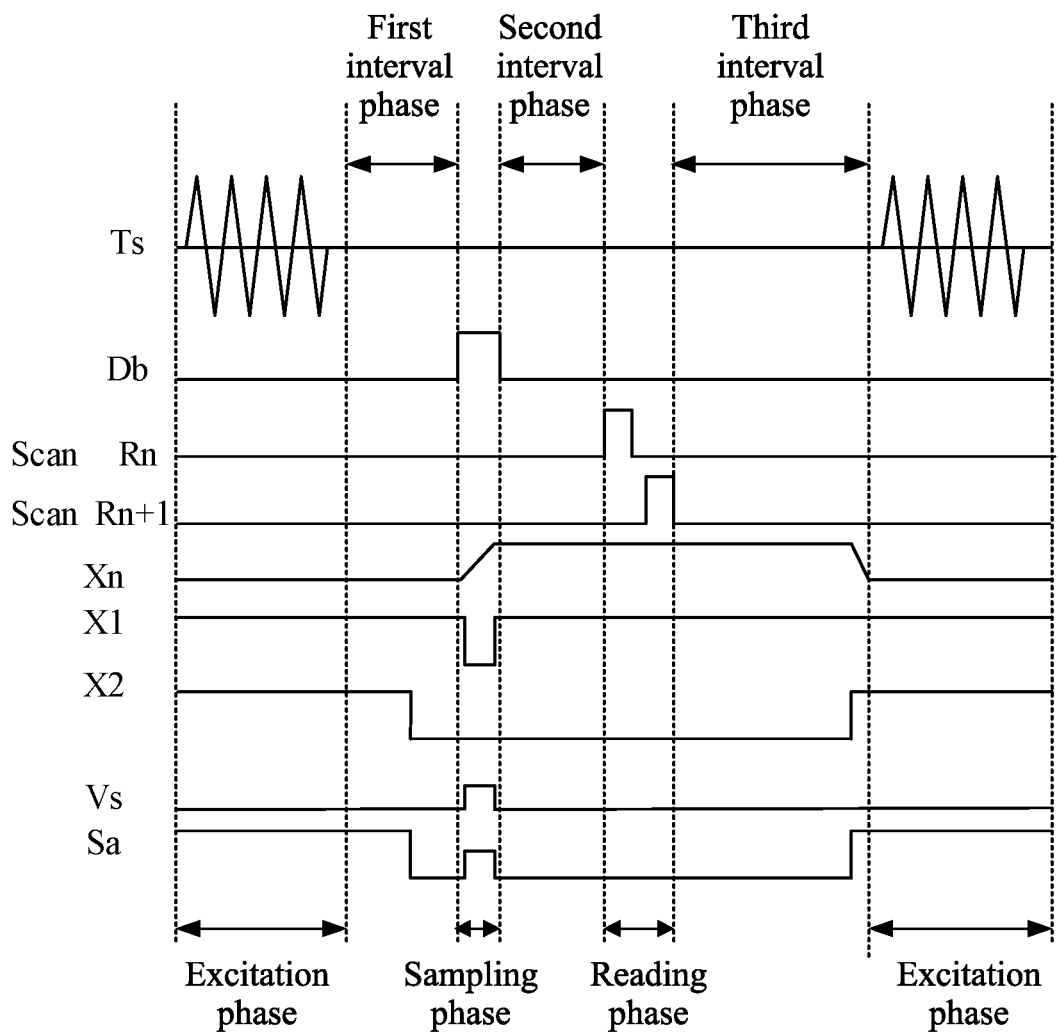
FIG. 14 is a driving timing diagram of another ultrasonic fingerprint recognition circuit provided by an embodiment of the present disclosure.

FIG. 14 is a driving timing diagram of another ultrasonic fingerprint recognition circuit provided by an embodiment of the present disclosure. With reference to FIG. 14, the rising edge of the first sampling voltage of a next frame is generated in the third interval phase of a current frame, that is, in the next frame, the first sampling voltage applied to the first sampling signal end X2 transfers from a low level to a high level during the third interval of the current frame. Therefore, in the next frame, before the oscillating voltage is applied to the ultrasonic signal input end Ts, the first sampling voltage is applied to the control end of the acquisition device 30, and the acquisition device 30 transmits the first bias voltage to the node Xn. As long as the oscillating voltage is applied to the signal input end Ts, the ultrasonic fingerprint recognizer 10 can transmit ultrasonic waves. It should be noted that power consumption of the oscillating voltage applied to the ultrasonic signal input end Ts is relatively large, so the rising edge of the first sampling voltage of the next frame generates in the third interval of the current frame, which can be used to make preparations for applying the oscillating voltage to prevent the oscillating voltage from appearing before the rising edge of the first sampling voltage.

In an embodiment, with reference to FIG. 12 to FIG. 14, the first bias voltage is less than the second bias voltage. In the embodiment of the present disclosure, in the excitation phase, the first bias voltage is applied to the bias voltage end Db and transmitted to the node Xn, in the sampling phase, the second bias voltage is applied to the bias voltage end Db and transmitted to the node Xn. The first bias voltage is less than the second bias voltage, so that in the excitation phase, a low-level voltage is applied to the node Xn to reduce the DC component and charge accumulation of the node Xn, so that the ultrasonic fingerprint recognizer 10 can transmit ultrasonic waves.

In an embodiment, with reference to FIG. 12 to FIG. 14, the first bias voltage is zero, that is, in the excitation phase, the potential applied to the bias voltage end Db and transmitted to the node Xn is zero, the node Xn has no DC component, and the node Xn has no charge accumulation, so that the ultrasonic fingerprint recognizer 10 can transmit ultrasonic waves.

In an embodiment, with reference to FIG. 1 to FIG. 14, the acquisition device 30 includes a first transistor M1, the gate of the first transistor M1 is electrically connected to the third end of the sampling signal device 20, and the first end of the first transistor M1 is electrically connected to the second end of the ultrasonic fingerprint recognizer 10, and the second end of the first transistor M1 is electrically connected to the bias voltage end Db. The difference between the second sampling voltage and the second bias voltage is less than the threshold voltage of the first transistor M1. In the embodiment of the present disclosure, the difference between the second sampling voltage and the second bias voltage is less than the threshold voltage of the first transistor M1, the voltage difference between the gate and the drain of the first transistor M1 and the drain current exhibits a non-linear relationship, which has the same effect as a diode and realizes sampling of the induced voltage generated by the ultrasonic fingerprint recognizer 10 for receiving ultrasonic echo. An advantage is that, compared with the diode, the electrical difference of first transistors M1 due to process variations is smaller, which reduces the difference in sampling capabilities of ultrasonic fingerprint recognition circuits and improves signal uniformity of different ultrasonic fingerprint recognition circuits.

Exemplarily, with reference to FIG. 4 to FIG. 14, the first transistor M1, the second transistor M2, the third transistor M3, the fourth transistor M4, the fifth transistor M5, the sixth transistor M6, and the seventh transistor M7 each are N-type transistors, and the gate of the N-type transistor is turned on at a high level and is turned off at a low level. In other embodiments, at least one of the first transistor M1, the second transistor M2, the third transistor M3, the fourth transistor M4, the fifth transistor M5, the sixth transistor M6, or the seventh transistor M7 may also be a P-type transistor, the gate of the P-type transistor is turned off at a high level and is turned on at a low level.

Exemplarily, with reference to FIG. 4, FIG. 9 and FIG. 14, taking that the first transistor M1, the second transistor M2, the third transistor M3, the fourth transistor M4, the fifth transistor M5, the sixth transistor M6, and the seventh transistor M7 each are N-type transistors as example, the driving method of the ultrasonic fingerprint recognition circuit includes steps described below.

In the excitation phase, the first sampling control voltage (a high level) is applied to the sampling control end X1, the fourth transistor M4 is turned on, the fifth transistor M5 is turned off. The first sampling voltage is applied to the first sampling signal end X2 and the first sampling voltage makes the first transistor M1 turned on. The first bias voltage (a low level) is applied to the bias voltage end Db, and the first bias voltage is applied to the second end (i.e., the node Xn) of the ultrasonic fingerprint recognizer 10. The ultrasonic signal input end Ts applies an oscillating voltage to the first end of the ultrasonic fingerprint recognizer 10. The ultrasonic fingerprint recognizer 10 transmits ultrasonic waves based on the voltage at the first end and the second end thereof. Since the first bias voltage of the node Xn is at a low level, the second transistor M2 is turned off. A low level is applied to the scan line Rn, and the third transistor M3 is turned off.

In the sampling phase, the second sampling control voltage (a low level) is applied to the sampling control end X1, the fourth transistor M4 is turned off, the fifth transistor M5 is turned on, and the second sampling voltage is applied to the second sampling signal end Vs, the second sampling voltage makes the first transistor M1 is turned on. The second sampling voltage is less than the first sampling voltage, and the first transistor M1 works in the non-linear region to improve sampling accuracy. A second bias voltage (a high level) is applied to the bias voltage end Db, and the second bias voltage is applied to the second end (i.e., the node Xn) of the ultrasonic fingerprint recognizer 10. The ultrasonic fingerprint recognizer 10 receives the ultrasonic echo and generates an induced voltage. The induced voltage is superimposed on the second bias voltage of the node Xn and stored in the storage device 40. A low level is applied to the scan line Rn, and the third transistor M3 is turned off.

In the reading phase, since the voltage of the node Xn is maintained at a high level by the capacitor C, the second transistor M2 is turned on in the reading phase. The first scan voltage (a high level) is applied to the scan signal input end Scan, the first scan voltage is applied to the scan line Rn electrically connected to the scan signal input end Scan, the third transistor M3 is turned on and it is in saturation state, the voltage difference between the gate of the second transistor M2 and the second electrode of the second transistor M2 remains fixed, so the voltage information of the gate of the second transistor M2 (i.e. the voltage of the node Xn) can be read to the second pole of the second transistor M2, and the voltage information of the node Xn can be read to the data signal end Data. It should be further noted that in the reading phase, the first scan voltage can be applied to scan lines Scan1 (e.g., scan line Rn and scan line Rn+1) in sequence, so that the third transistor M3 of ultrasonic fingerprint recognition circuits is turned on column by column.

Figure 15:
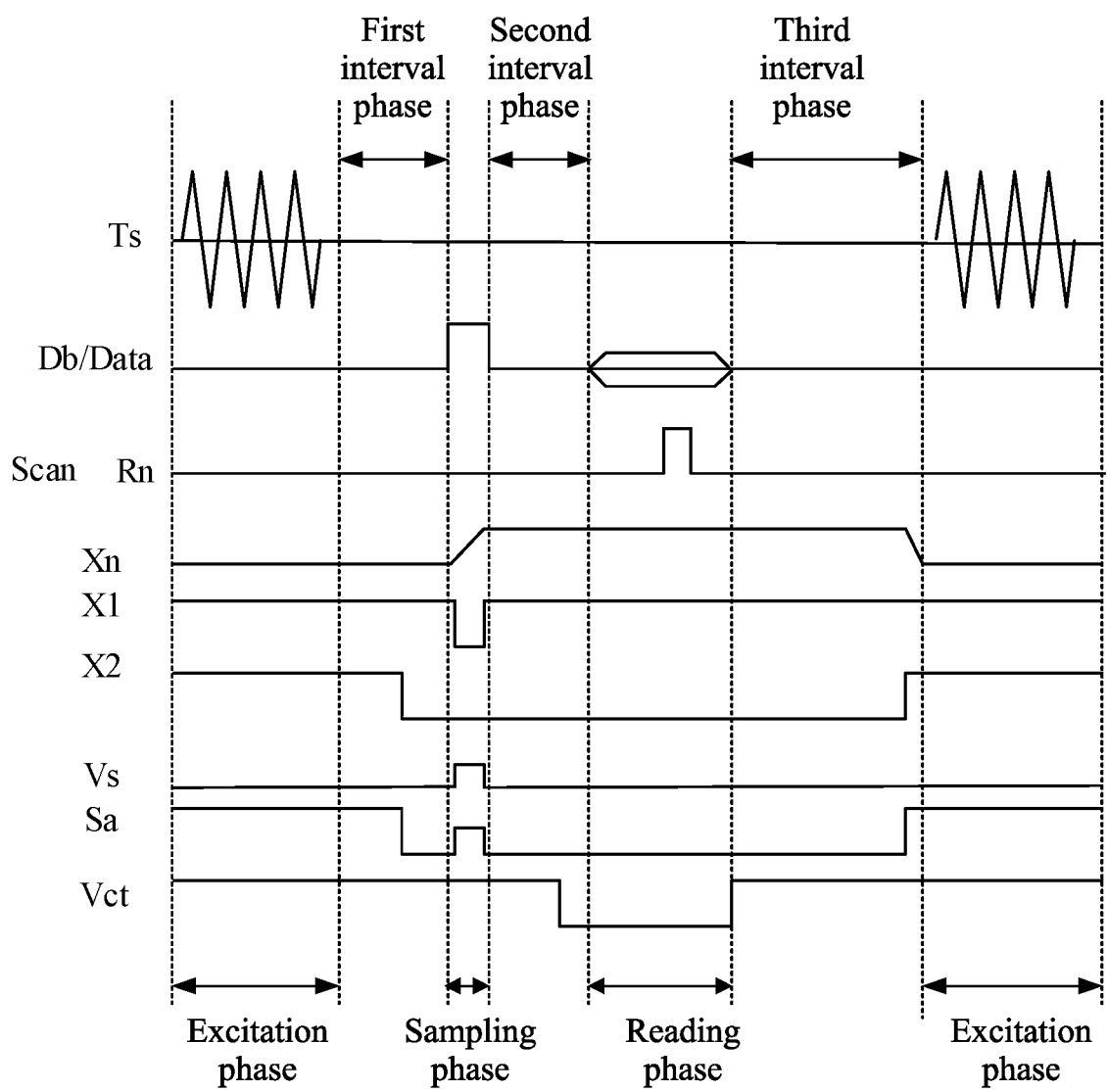
FIG. 15 is a driving timing diagram of another ultrasonic fingerprint recognition circuit provided by an embodiment of the present disclosure.

FIG. 15 is a driving timing diagram of another ultrasonic fingerprint recognition circuit provided by an embodiment of the present disclosure. With reference to FIG. 6, FIG. 9 and FIG. 15, the second end of the acquisition device 30 and the second end of the reading device 50 are electrically connected. The ultrasonic fingerprint recognition circuit also includes a sixth transistor M6, a seventh transistor M7, and a second inverter Inv2. The gate of the sixth transistor M6 is electrically connected to the multiplexing control end Vct of the ultrasonic fingerprint recognition circuit, the first electrode of the sixth transistor M6 is electrically connected to the bias voltage end Db, and the second electrode of the sixth transistor M6 is electrically connected to the second end of the reading device 50. The input end of the second inverter Inv2 is electrically connected to the multiplexing control end Vct, and the output end of the second inverter Inv2 is electrically connected to the gate of the seventh transistor M7. The first electrode of the seventh transistor M7 is electrically connected to the data signal end Data, and the second electrode of the seventh transistor M7 is electrically connected to the second end of the reading device 50. In the excitation phase and the sampling phase, the first multiplexing voltage is applied to the multiplexing control end Vct, to control the sixth transistor M6 to turn on and the seventh transistor M7 to turn off, and the first bias voltage or the second bias voltage of the bias voltage end Db is applied to the node Xn. In the reading phase, the second multiplexing voltage is applied to the multiplexing control end Vct, to control the sixth transistor M6 to be turned off and the seventh transistor M7 to be turned on, and read the voltage information of the node Xn to the data signal end Data.

Exemplarily, with reference to FIG. 6, FIG. 9 and FIG. 15, in the excitation phase, the first multiplexing voltage (a high level) is applied to the multiplexing control end Vct, the sixth transistor M6 is turned on, and the seventh transistor M7 is turned off. The first bias voltage of the set voltage end Db is applied to the node Xn. In the sampling phase, the first multiplexing voltage (a high level) is applied to the multiplexing control end Vct, the sixth transistor M6 is turned on, the seventh transistor M7 is turned off, and the second bias voltage of the bias voltage end Db is applied to the node Xn. In the reading phase, the second multiplexing voltage (a low level) is applied to the multiplexing control end Vct, the sixth transistor M6 is turned off, and the seventh transistor M7 is turned on, and the voltage information of the node Xn is read to the data signal end Data.

What is claimed is:

1. An ultrasonic fingerprint recognition circuit, comprising:
    an ultrasonic fingerprint recognizer, a sampling signal device, an acquisition device, a storage device, and a reading device; wherein
    a first end of the ultrasonic fingerprint recognizer is electrically connected to an ultrasonic signal input end of the ultrasonic fingerprint recognition circuit, and a second end of the ultrasonic fingerprint recognizer is electrically connected to a first end of the acquisition device;
    a control end of the sampling signal device is electrically connected to a sampling control end of the ultrasonic fingerprint recognition circuit, a first end of the sampling signal device is electrically connected to a first sampling signal end of the ultrasonic fingerprint recognition circuit, a second end of the sampling signal device is electrically connected to a second sampling signal end of the ultrasonic fingerprint recognition circuit, and a third end of the sampling signal device is electrically connected to a control end of the acquisition device;
    a second end of the acquisition device is electrically connected to a bias voltage end of the ultrasonic fingerprint recognition circuit;
    a first end of the storage device is electrically connected to the second end of the ultrasonic fingerprint recognizer, and a second end of the storage device is electrically connected to a power signal end of the ultrasonic fingerprint recognition circuit;
    wherein a first control end of the reading device is electrically connected to the second end of the ultrasonic fingerprint recognizer, a second control end of the reading device is electrically connected to a scan signal input end of the ultrasonic fingerprint recognition circuit, a first end of the reading device is electrically connected to the power signal end of the ultrasonic fingerprint recognition circuit, and a second end of the reading device is electrically connected to a data signal end of the ultrasonic fingerprint recognition circuit; and
    wherein the sampling signal device comprises a fourth transistor, a fifth transistor and a first inverter;
    a gate of the fourth transistor is electrically connected to the sampling control end of the ultrasonic fingerprint recognition circuit, a first electrode of the fourth transistor is electrically connected to the first sampling signal end of the ultrasonic fingerprint recognition circuit, and a second electrode of the fourth transistor is electrically connected to the control end of the acquisition device;
    an input end of the first inverter is electrically connected to the sampling control end of the ultrasonic fingerprint recognition circuit, and an output end of the first inverter is electrically connected to a gate of the fifth transistor; and
    a first electrode of the fifth transistor is electrically connected to the second sampling signal end of the ultrasonic fingerprint recognition circuit, and a second electrode of the fifth transistor is electrically connected to the control end of the acquisition device.

2. The ultrasonic fingerprint recognition circuit of claim 1, wherein the acquisition device comprises a first transistor, a gate of the first transistor is electrically connected to a third end of the sampling signal device, a first electrode of the first transistor is electrically connected to the second end of the ultrasonic fingerprint recognizer, and a second electrode of the first transistor is electrically connected to the bias voltage end of the ultrasonic fingerprint recognition circuit.

3. The ultrasonic fingerprint recognition circuit of claim 1, wherein the storage device comprises:
    a capacitor, a first electrode of the capacitor is electrically connected to the second end of the ultrasonic fingerprint recognizer, and a second electrode of the capacitor is electrically connected to the power signal end of the ultrasonic fingerprint recognition circuit;
    the reading device comprises a second transistor and a third transistor; a gate of the second transistor is electrically connected to the second end of the ultrasonic fingerprint recognizer, a first electrode of the second transistor is electrically connected to the power signal end of the ultrasonic fingerprint recognition circuit, and a second electrode of the second transistor is electrically connected to a first electrode of the third transistor; and
    a gate of the third transistor is electrically connected to the scan signal input end of the ultrasonic fingerprint recognition circuit, and a second electrode of the third transistor is electrically connected to the data signal end of the ultrasonic fingerprint recognition circuit.

4. The ultrasonic fingerprint recognition circuit of claim 1, wherein a second end of the acquisition device is electrically connected to the second end of the reading device.

5. The ultrasonic fingerprint recognition circuit of claim 4, further comprising:
    a sixth transistor, a seventh transistor and a second inverter;
    a gate of the sixth transistor is electrically connected to a multiplexing control end of the ultrasonic fingerprint recognition circuit, a first electrode of the sixth transistor is electrically connected to the bias voltage end of the ultrasonic fingerprint recognition circuit, and a second electrode of the sixth transistor is electrically connected to the second end of the reading device;

an input end of the second inverter is electrically connected to the multiplexing control end, and an output end of the second inverter is electrically connected to a gate of the seventh transistor; and a first electrode of the seventh transistor is electrically connected to the data signal end, and a second electrode of the seventh transistor is electrically connected to the second end of the reading device.

6. The ultrasonic fingerprint recognition circuit of claim 1, further comprising a diode, an anode of the diode is electrically connected to the second end of the ultrasonic fingerprint recognizer, and a cathode of the diode is electrically connected to the power signal end of the ultrasonic fingerprint recognition circuit.

7. A display panel, comprising:
an ultrasonic fingerprint recognition circuit, wherein ultrasonic fingerprint recognition circuit comprises: an ultrasonic fingerprint recognizer, a sampling signal device, an acquisition device, a storage device, and a reading device; wherein a first end of the ultrasonic fingerprint recognizer is electrically connected to an ultrasonic signal input end of the ultrasonic fingerprint recognition circuit, and a second end of the ultrasonic fingerprint recognizer is electrically connected to a first end of the acquisition device;

a control end of the sampling signal device is electrically connected to a sampling control end of the ultrasonic fingerprint recognition circuit, a first end of the sampling signal device is electrically connected to a first sampling signal end of the ultrasonic fingerprint recognition circuit, a second end of the sampling signal device is electrically connected to a second sampling signal end of the ultrasonic fingerprint recognition circuit, and a third end of the sampling signal device is electrically connected to a control end of the acquisition device;

a second end of the acquisition device is electrically connected to a bias voltage end of the ultrasonic fingerprint recognition circuit;

a first end of the storage device is electrically connected to the second end of the ultrasonic fingerprint recognizer, and a second end of the storage device is electrically connected to a power signal end of the ultrasonic fingerprint recognition circuit; and a first control end of the reading device is electrically connected to the second end of the ultrasonic fingerprint recognizer, a second control end of the reading device is electrically connected to a scan signal input end of the ultrasonic fingerprint recognition circuit, a first end of the reading device is electrically connected to the power signal end of the ultrasonic fingerprint recognition circuit, and a second end of the reading device is electrically connected to a data signal end of the ultrasonic fingerprint recognition circuit; and wherein the sampling signal device comprises a fourth transistor, a fifth transistor and a first inverter;

a gate of the fourth transistor is electrically connected to the sampling control end of the ultrasonic fingerprint recognition circuit, a first electrode of the fourth transistor is electrically connected to the first sampling signal end of the ultrasonic fingerprint recognition circuit, and a second electrode of the fourth transistor is electrically connected to the control end of the acquisition device;

an input end of the first inverter is electrically connected to the sampling control end of the ultrasonic fingerprint recognition circuit, and an output end of the first inverter is electrically connected to a gate of the fifth transistor; and a first electrode of the fifth transistor is electrically connected to the second sampling signal end of the ultrasonic fingerprint recognition circuit, and a second electrode of the fifth transistor is electrically connected to the control end of the acquisition device.

8. The display panel of claim 7, further comprising:
a plurality of scan lines and a plurality of data readout lines, wherein the plurality of scan lines extend along a second direction and are arranged along a first direction, the plurality of data readout lines extend along the first direction and are arranged along the second direction, and the first direction intersects the second direction;

along the first direction, second ends of reading devices in a plurality of ultrasonic fingerprint recognition circuits are electrically connected to the data signal end through a same data readout line; and along the second direction, second control ends of reading devices in a plurality of ultrasonic fingerprint recognition circuits are electrically connected to the scan signal input end through a same scan line.

9. The display panel of claim 8, further comprising:
a plurality of power connection lines, a plurality of bias voltage connection lines, and a plurality of sampling connection lines; wherein along the first direction, first ends of reading devices in a plurality of ultrasonic fingerprint recognition circuits are electrically connected to the power signal end through a same power connection line;

along the first direction, second ends of acquisition devices in a plurality of ultrasonic fingerprint recognition circuits are electrically connected to the bias voltage end through a same bias voltage connection line; and along the second direction, control ends of acquisition devices in a plurality of ultrasonic fingerprint recognition circuits are electrically connected to the third end of the sampling signal device through a same sampling connection line.

10. A display device, comprising the display panel of claim 7.

11. A driving method for driving an ultrasonic fingerprint recognition circuit,
wherein the ultrasonic fingerprint recognition circuit comprises:
an ultrasonic fingerprint recognizer, a sampling signal device, an acquisition device, a storage device, and a reading device; wherein a first end of the ultrasonic fingerprint recognizer is electrically connected to an ultrasonic signal input end of the ultrasonic fingerprint recognition circuit, and a second end of the ultrasonic fingerprint recognizer is electrically connected to a first end of the acquisition device;

a control end of the sampling signal device is electrically connected to a sampling control end of the ultrasonic fingerprint recognition circuit, a first end of the sampling signal device is electrically connected to a first sampling signal end of the ultrasonic fingerprint recognition circuit, a second end of the sampling signal device is electrically connected to a second sampling signal end of the ultrasonic fingerprint recognition circuit, and a third end of the sampling signal device is electrically connected to a control end of the acquisition device;

a second end of the acquisition device is electrically connected to a bias voltage end of the ultrasonic fingerprint recognition circuit; and a first end of the storage device is electrically connected to the second end of the ultrasonic fingerprint recognizer, and a second end of the storage device is electrically connected to a power signal end of the ultrasonic fingerprint recognition circuit;

wherein the driving method for driving the ultrasonic fingerprint recognition circuit, comprises:

in an excitation phase, applying a first sampling control voltage to the sampling control end, applying a first sampling voltage to the first sampling signal end, applying a first bias voltage to the bias voltage end, and applying an oscillation voltage to the first end of the ultrasonic fingerprint recognizer; wherein the acquisition device responds to the first sampling voltage to transmit the first bias voltage to the second end of the ultrasonic fingerprint recognizer, and the ultrasonic fingerprint recognizer transmit ultrasonic waves based on a voltage of the first end and a voltage of the second end;

in a sampling phase, applying a second sampling control voltage to the sampling control end, applying a second sampling voltage to the second sampling signal end, and applying a second bias voltage to the bias voltage end; wherein the acquisition device responds to the second sampling voltage to transmit the second bias voltage to the second end of the ultrasonic fingerprint recognizer, and the ultrasonic fingerprint recognizer receives ultrasonic echo reflected by a touched subject, generates an induced voltage, and stores the induced voltage in the storage device; and in a reading phase, applying a first scan voltage to the scan signal input end, and the reading device responds to the first scan voltage to read voltage information of the second end of the ultrasonic fingerprint recognizer to the data signal end;

wherein the second sampling voltage is less than the first sampling voltage.

12. The driving method of claim 11, further comprising a first interval phase, wherein the first interval phase is between the excitation phase and the sampling phase.

13. The driving method of claim 12, in the first interval phase, applying the first sampling control voltage to the sampling control end, and applying a third sampling voltage to the first sampling signal end, wherein the third sampling voltage is less than the first sampling voltage, and the third sampling voltage is less than the second sampling voltage.

14. The driving method of claim 12, wherein a falling edge of the first sampling voltage generates in the first interval phase.

15. The driving method of claim 11, further comprising a second interval phase and a third interval phase, wherein the second interval phase is between the sampling phase and the reading phase, and the third interval phase is between a reading phase of a current frame and an excitation phase of a next frame.

16. The driving method of claim 15, wherein a rising edge of a first sampling voltage of the next frame generates in a third interval phase of the current frame.

17. The driving method of claim 11, wherein the first bias voltage is less than the second bias voltage.

18. The driving method of claim 17, wherein the first bias voltage is zero.

19. The driving method of claim 11, wherein the acquisition device comprises a first transistor, a gate of the first transistor is electrically connected to the third end of the sampling signal device, a first electrode of the first transistor is electrically connected to the second end of the ultrasonic fingerprint recognizer, and a second electrode of the first transistor is electrically connected to the bias voltage end;

wherein a difference between the second sampling voltage and the second bias voltage is less than a threshold voltage of the first transistor.

* * * * *